United States Patent [19]

Stedman

[11] 4,057,121
[45] Nov. 8, 1977

[54] MODULAR REAR AXLE SUSPENSION AND DRIVE ARRANGEMENT FOR TRUCKS

[75] Inventor: Robert N. Stedman, Chillicothe, Ill.

[73] Assignee: Caterpillar Tractor Co., Peoria, Ill.

[21] Appl. No.: 664,719

[22] Filed: Mar. 8, 1976

[51] Int. Cl.² .............................................. B60K 1/00
[52] U.S. Cl. ....................................... 180/56; 180/60
[58] Field of Search ................... 180/57 C, 56, 55, 63, 180/60, 61, 62, 59, 58, 57, 65 R, 54 D, 54 E

[56] References Cited

U.S. PATENT DOCUMENTS

| 715,596 | 12/1902 | Nilson | 180/56 |
|---|---|---|---|
| 1,223,495 | 4/1917 | Kelley | 180/57 |
| 3,117,648 | 1/1964 | Landreth | 180/55 |
| 3,460,646 | 8/1969 | Sons, Jr. | 180/73 R |
| 3,662,849 | 5/1972 | Bostad et al. | 180/54 E |
| 3,726,540 | 4/1973 | Grooss | 280/677 |
| 3,862,667 | 1/1975 | Wolansky | 180/43 R |
| 3,927,728 | 12/1975 | Reime | 180/60 |

Primary Examiner—Joseph F. Peters, Jr.
Assistant Examiner—Donn McGiehan
Attorney, Agent, or Firm—Phillips, Moore, Weissenberger, Lempio & Majestic

[57] ABSTRACT

A truck comprises a main frame having a U-shaped subframe, including a pair of side beams and a forward cross-beam, universally mounted thereon by a ball and socket connection. A rearward end of each side beam is mounted under the main frame of the truck by a suspension cylinder pivotally interconnected therebetween. A drive motor is mounted on each of the side beams and has an output shaft thereof drivingly connected to at least one roadwheel, rotatably mounted on a spindle secured to a rearward end of each side beam. A rearward cross-beam is preferably secured between the rearward ends of the side beams in axial alignment with the spindles.

12 Claims, 3 Drawing Figures

MODULAR REAR AXLE SUSPENSION AND DRIVE ARRANGEMENT FOR TRUCKS

BACKGROUND OF THE INVENTION

The suspension and drive arrangement for the rear axle of a truck normally comprises a differential housing having roadwheels mounted thereon with suspension cylinders being pivotally interconnected between a main frame of the truck and the housing. In addition, a stabilizer bar is normally pivotally interconnected between the housing and the frame. The differential receives power from an internal combustion engine and transmission to transmit the same to the roadwheels in a conventional manner. In addition to the obvious manufacturing and servicing problems, the disposition of the differential housing on the truck does not always provide the desired ground clearance for trucking operations.

SUMMARY OF THIS INVENTION

An object of this invention is to provide a modular rear axle suspension and drive arrangement for trucks which is adapted to facilitate manufacture and servicing thereof. In addition, such arrangement is adapted to provide a high degree of ground clearance thereunder and further provides a high degree of structural integrity and suspension desiderata therein.

The suspension and drive arrangement comprises a generally U-shaped sub-frame having a pair of laterally spaced side beams secured together by a forwardly disposed cross-beam. A drive motor is mounted on each of the side beams and has an output shaft thereof drivingly connected to a roadwheel, rotatably mounted on a spindle secured rearwardly on each of the side beams. In the preferred embodiment of this invention, a rearwardly disposed cross-beam is secured between the side beams in axial alignment with the wheel spindles to further increase the structural integrity and rigidity of the integrated arrangement. Furthermore, a suspension cylinder is preferably pivotally interconnected between a main frame of the vehicle and each of the side beams whereas a stabilizer bar is pivotally interconnected between the main frame and the rearwardly disposed cross-beam.

BRIEF DESCRIPTION OF THE DRAWINGS

Other objects of this invention will become apparent from the following description and accompanying drawings wherein.

DETAILED DESCRIPTION

Figure 1:
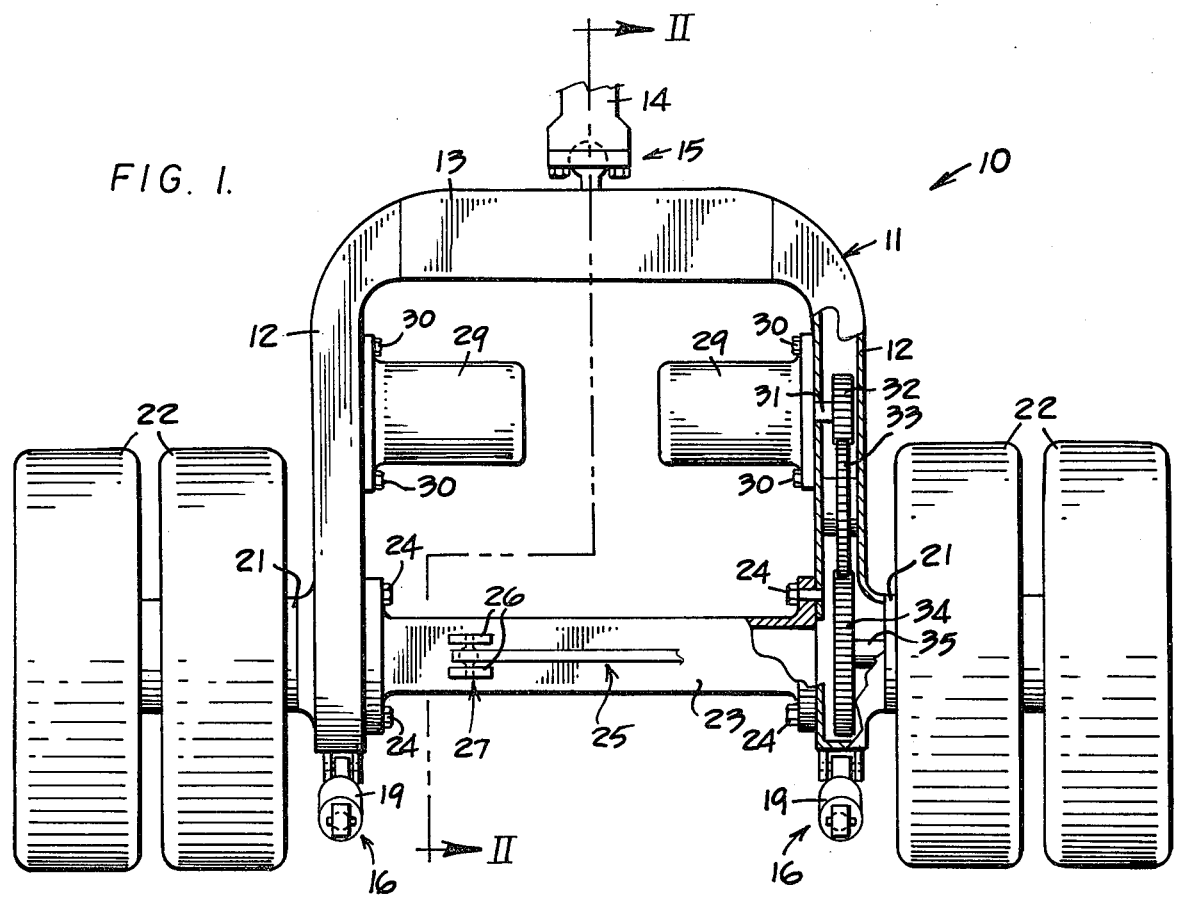
FIG. 1 is a partially sectioned top plan view of a modular rear axle suspension and drive arrangement for trucks.

FIG. 1 illustrates a modular rear axle suspension and drive arrangement for trucks comprising a generally U-shaped sub-frame 11. The sub-frame comprises a pair of laterally spaced and parallel hollow side beams 12 secured together at forward ends thereof by a forward cross-beam 13. Cross-beam 13 may be universally connected to an overlying main frame 14 of a truck by a ball and socket connection 15.

The rearward end of each side beam 12 is mounted beneath main frame 14 by a conventional suspension cylinder 16 pivotally interconnected therebetween. In particular, a strut of the cylinder 16 has its lower end universally connected to a pair of lugs 17 secured to a rearward end of side beam 12 by a ball and socket connection 18. The upper end of the strut is reciprocally mounted in a housing 19, having its upper end universally connected in a like manner to frame 14 by a ball and socket connection 20.

The suspension cylinder is conventional and functions to absorb loading shocks and haul road bumps to provide a smooth ride and to reduce stresses which would otherwise be imposed on components of the truck. For example, upon movement of the truck over uneven terrain, the strut will move upwardly in housing 19 to compress a volume of nitrogen contained therein. Such movement will also force oil into a rebound chamber through orifices (not shown) formed in the cylinder. Upon dropping of sub-frame 11 relative to main frame 14, the compressed nitrogen will function to push the strut in a smooth manner, back to its normal position, and orifices and a ball check valve (not shown) will control oil flow and rebound rate to prevent harsh rebounding. Since the suspension cylinder may be of any chosen conventional design, further detailed description thereof is deemed unnecessary.

A tubular spindle 21 is suitably secured on a rearward end and outboard side of each side beam 12 by welds, bolts or the like. Each spindle extends laterally outwardly from a respective side beam and rotatably mounts a pair of roadwheels 22 thereon in a conventional manner. A rearwardly disposed cross or box beam 23 of rectangular cross section is secured between rearward ends of side beams 12 by bolts 24 and is disposed in axial alignment with spindles 21.

A stabilizer bar or tag link 25 is pivotally interconnected between beam 23 and main frame 14 of the truck. The tag link is disposed transversely relative to a longitudinal axis of the truck and in general alignment with beam 23. The lower end of the tag link is universally connected to lugs 26, secured on the upper side of beam 23, by a ball and socket connection 27. The upper end of the tag link is universally connected in a like manner to main frame 14 by a ball and socket connection 28.

The power input means to each pair of roadwheels 22 comprises an electric or hydraulic motor 29 detachably mounted on an inboard side of each side beam 12 by a plurality of circumferentially disposed bolts 30. The motor has an output shaft 31 which is disposed interiorly of the side beam. The shaft functions to selectively rotate the roadwheels by a stepped-down gear train and speed reducer, constituting drive means drivingly interconnected between the drive motor and the roadwheels.

In particular, motor shaft 31 has a first spur gear 32 secured on an end thereof which meshes with a second or intermediate spur gear 33 which is rotatably mounted on side beam 12. The second spur gear, in turn, meshes with a third spur gear 34 disposed in tandem relationship relative to the other spur gears and which is secured on an inboard end of a drive axle 35 for the roadwheels. The drive axle may be suitably connected to the roadwheels for driving the same by a standard final drive, including a brake package (not shown).

Figure 3:
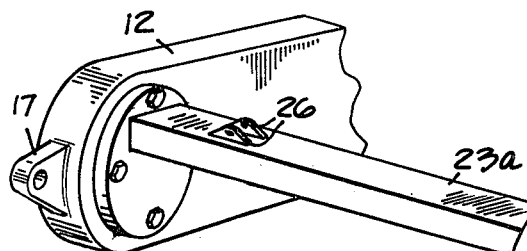
FIG. 3 is a partial isometric view of a modified sub-frame employed in the suspension and drive arrangement.
Figure 2:
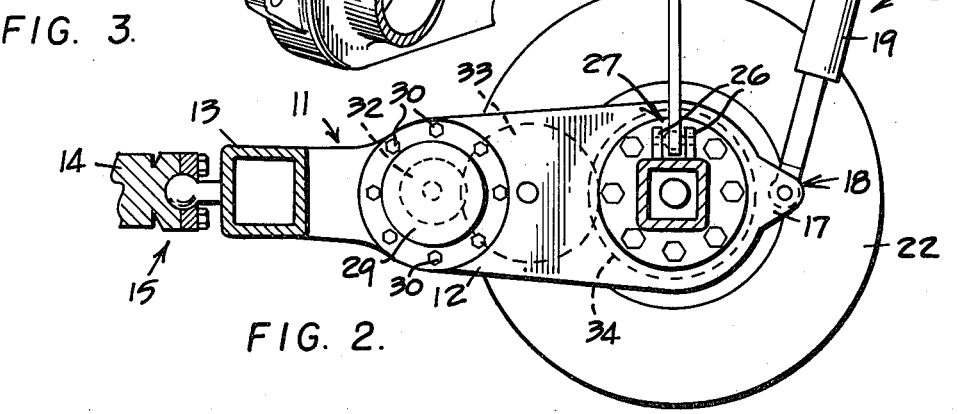
FIG. 2 is a sectional view in elevation of the suspension and drive arrangement, taken in the direction of arrows II—II in FIG. 1.

FIG. 3 illustrates a modification of the FIGS. 1 and 2 rear axle suspension and drive arrangement wherein identical numerals identify corresponding constructions. The essential difference between the two embodiments constitutes the construction and arrangement of a rearwardly disposed cross-beam 23a in FIG. 3 which corresponds to cross-beam 23 in FIG. 1. The inverted U-shape of cross-beam 23a will further increase ground clearance over that provided by the box structure of cross-beam 23 while yet providing the desired structural integrity at the rearward end of the sub-frame.

From the above description it can be seen that the modular rear axle suspension and drive arrangement of this invention exhibits manufacturing and servicing desiderata over conventional rear axle arrangements. For example, the suspension and drive arrangement can be expeditiously removed from a truck for servicing purposes by merely disconnecting ball and socket connections 15, 20 and 28. Relatively free access to the component parts of the arrangement is thus provided, due to the relatively open framework construction of sub-frame 11 and its attendant components.

The mounting of electric drive motors 29 inboard of side beams 12 places them in a protected area during operation of the truck, along with each set of stepped-down gearing 32-34 which is entirely housed within a hollow side beam. The coaxial arrangement of cross-beam 23 or 23a with wheel spindles 21 essentially provides a solid axle member between the roadwheels which thus further increases the structural integrity of the intergrated structure. Furthermore, the pivotal mounting of suspension cylinders 16 on the end of the side beams provides a suspension system, along with stabilizer bar 25 and ball and socket connection 15, that function to stabilize and maintain sub-frame 11 in a fully supported and ride-controlled disposition beneath main frame 14 of the truck.

I claim:

1. A modular axle suspension and drive arrangement adapted for attachment to the main frame of a vehicle comprising
   a generally U-shaped sub-frame having a pair of laterally spaced side beams secured together at forward ends thereof by a forward cross-beam disposed transversely relative thereto,
   a drive motor, having an output shaft, mounted on each of said side beams,
   a spindle secured on a rearward end of each of said side beams and extending laterally outwardly therefrom, the drive motor mounted on each of said side beams being disposed longitudinally between said spindle and said cross-beam,
   at least one roadwheel rotatably mounted on each of said spindles, and
   drive means drivingly interconnected between the output shaft of each drive motor and a respective roadwheel for selectively driving the same.

2. The arrangement of claim 1 wherein said sub-frame further comprises a rearward cross-beam secured between rearward ends of said side beams.

3. The arrangement of claim 2 wherein said rearward cross-beam is disposed in co-axial relationship between said spindles.

4. The arrangement of claim 2 wherein said rearward cross-beam has a rectangular cross-section.

5. The arrangement of claim 2 wherein said rearward cross-beam has an inverted U-shape.

6. The arrangement of claim 1 wherein each drive means is mounted in protected relationship within a respective one of said side beams and the drive motor connected thereto is mounted on an inboard side of such side beam.

7. The arrangement of claim 6 wherein each of said drive means comprises a gear train and an axle rotatably mounted in a respective spindle and drivingly connected to the roadwheel rotatably mounted thereon.

8. The arrangement of claim 1 further comprising a main frame of a vehicle at least partially overlying said sub-frame and connection means universally pivoting the forward cross-beam of said sub-frame to a rearward end of said main frame.

9. The arrangement of claim 8 further comprising a suspension cylinder pivotally interconnected between said main frame and each side beam of said sub-frame.

10. The arrangement of claim 9 wherein each suspension cylinder is pivotally connected to a rearward end of a respective side beam.

11. The arrangement of claim 8 further comprising a tag link pivotally interconnected between said main frame and said sub-frame.

12. The arrangement of claim 11 wherein said sub-frame further comprises a rearward cross-beam secured between rearward ends of said side beams in co-axial relationship between said spindles and wherein said tag link is generally aligned with said rearward cross-beam and is pivotally interconnected between said main frame and said rearward cross-beam.

* * * * *